United States Patent [19]

Ramsey et al.

[11] 4,303,302
[45] Dec. 1, 1981

[54] PIEZOELECTRIC OPTICAL SWITCH

[75] Inventors: Hubert J. Ramsey, Burlington; Mark L. Dakss, Sudbury, both of Mass.

[73] Assignee: GTE Laboratories Incorporated, Waltham, Mass.

[21] Appl. No.: 89,709

[22] Filed: Oct. 30, 1979

[51] Int. Cl.³ .............................................. G02B 5/14
[52] U.S. Cl. ........................... 350/96.20; 350/96.15
[58] Field of Search .............. 350/96.15, 96.16, 96.20, 350/96.21, 96.22

[56] References Cited

U.S. PATENT DOCUMENTS

| | | | |
|---|---|---|---|
| 3,208,342 | 9/1965 | Nethercot, Jr. .................. | 350/96.15 |
| 3,299,368 | 1/1967 | Klebba ............................ | 350/360 X |
| 3,330,957 | 7/1967 | Runnels ........................... | 250/199 |
| 3,440,560 | 4/1969 | Pole ................................ | 331/94.5 C |
| 3,458,829 | 7/1969 | Pole et al. ....................... | 331/94.5 C |
| 3,650,187 | 3/1972 | Judin .............................. | 350/96.15 X |
| 3,834,795 | 9/1974 | Erickson et al. ................. | 350/285 |
| 3,976,358 | 8/1976 | Thompson ....................... | 350/96.13 |
| 4,068,191 | 1/1978 | Zemon et al. .................... | 331/94.5 M |
| 4,146,856 | 3/1979 | Jaeschke .......................... | 335/151 |
| 4,152,043 | 5/1979 | Albanese ......................... | 350/96.20 |
| 4,189,206 | 2/1980 | Terai et al. ....................... | 350/96.20 |
| 4,193,662 | 3/1980 | Hara ................................ | 350/96.15 |
| 4,212,513 | 7/1980 | Gravel ............................. | 350/96.15 |

FOREIGN PATENT DOCUMENTS

| | | | |
|---|---|---|---|
| 2016498 | 10/1971 | Fed. Rep. of Germany ... | 350/96.20 |
| 2531398 | 7/1976 | Fed. Rep. of Germany ... | 350/96.20 |
| 2704984 | 8/1978 | Fed. Rep. of Germany ... | 350/96.20 |
| 2737499 | 2/1979 | Fed. Rep. of Germany ... | 350/96.20 |
| 2412084 | 7/1979 | France ............................ | 350/96.20 |
| 1426475 | 2/1975 | United Kingdom . | |

OTHER PUBLICATIONS

Ohmori et al., "Optical Fiber Switch Driven by PZT Bimorph", *Applied Optics,* vol. 17, No. 22, Nov. 1978, pp. 3531-3532.
"Moving-Fiber Switch", *Laser Focus,* vol. 15, No. 2, Feb. 1979, p. 55.
Crow, "Fiber-Optic Switch", *IBM Tech. Discl. Bull.,* vol. 21, No. 11, Apr. 1979, p. 4686.
Leighton, "Fiber Optic Shutter", *IBM Tech. Discl. Bull.,* vol. 11, No. 8, Jan. 1969, pp. 912-913.
Edmiston, "Piezoelectric Ceramic Transducers", *Electronic Design,* vol. 18, Sep. 1974, pp. 78-82.
Hale et al., "Mechanical Optical-Fibre Switch", *Electronics Letters,* vol. 12, No. 15, Jul. 1976, p. 388.
Reynolds et al., "Consider Piezoelectric Ceramics", *Electronic Design,* vol. 19, Sep. 1977, pp. 92-97.
American Heritage Dictionary; William Morris, Editor; Houghton Mifflin Co. (Boston); 1976; p. 122.

*Primary Examiner*—John K. Corbin
*Assistant Examiner*—John D. Lee
*Attorney, Agent, or Firm*—Fred Fisher

[57] ABSTRACT

A piezoelectric optical switch includes a piezoelectrical element having an optical fiber affixed thereto. A second optical fiber is placed in general proximity to the first optical fiber so that, upon application of a first voltage to the piezoelectric element, the optical fibers are caused to be aligned, and wherein upon application of a different voltage to the element, the optical fibers are caused to be nonaligned.

The switch can include a nonpiezoelectric cantilever beam having a fixed end and a free end and adapted to be bent along an axis adjoining the two ends. One optical fiber is affixed to the beam. A plurality of optical fibers, each in general proximity to and each adapted to be selectively aligned with the one optical fiber, is provided. A piezoelectric bending element, having opposite ends coupled to fixed supports, has a medial portion coupled to the cantilever beam near the fixed end. Thus, upon application of a first voltage to the bending element, the first optical fiber is caused to be aligned with a specific one of the plurality of optical fibers. Upon application of a different voltage to the bending element, the first optical fiber is caused to be aligned with a specific different one of the plurality of optical fibers.

9 Claims, 3 Drawing Figures

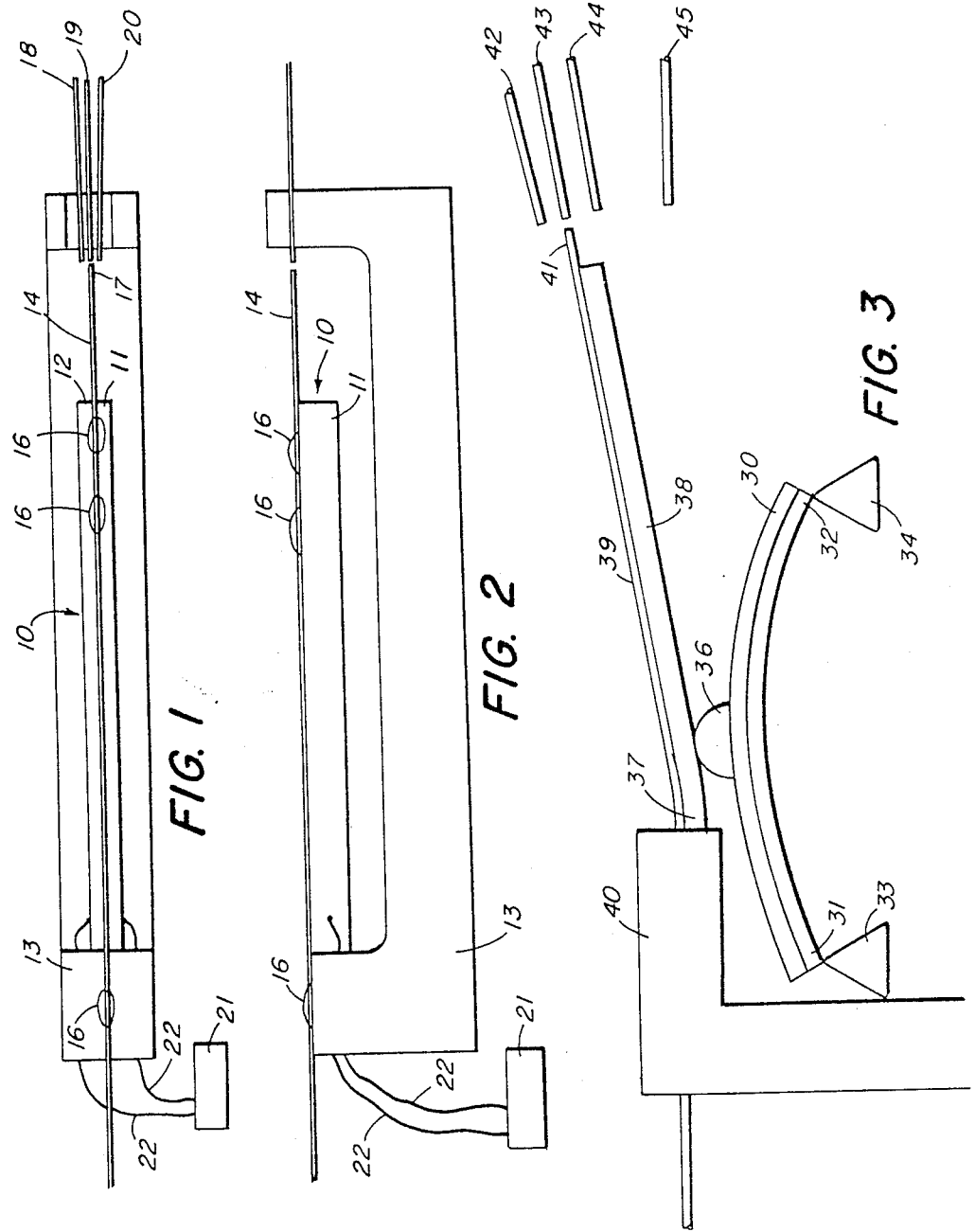

PIEZOELECTRIC OPTICAL SWITCH

BACKGROUND OF THE INVENTION

1. Field of the Invention

This invention relates to optical switches. Accordingly, it is the general object of this invention to provide new and improved switches of such character.

2. Description of the Prior Art

Recently optical fiber has found utility in various fields including telecommunications wherein light can be passed through an optical fiber to convey information either in digital or analog form. It is highly desirable to have light switch from one optical fiber to another and for so doing, various techniques have been suggested in the past.

Several mechanical fiber switches have been reported in the past usually involving a coil electromagnet to produce motion of a fiber, prism or a plate. Another type of switch involves a three db beam splitter followed by a modulator in each leg. These switches suffer problems of large volume, large loss, and/or difficulty in switching one fiber between more than two fibers. Various other switches are described in various United States patents.

U.S. Pat. No. 3,208,342 to Nethercot, Jr., issued Sept. 28, 1965, discloses electro-optic light coupling of optical fibers with a piezoelectric material as a coupling medium. A controllable electric field is applied across electrodes positioned opposite each other adjacent the piezoelectric material to vary the refractive index of that material. Variation of the refractive index modulates the coupling. No mechanical motion is involved.

U.S. Pat. No. 3,299,368 to Klebba, issued Jan. 17, 1967, discloses a laser light gate utilizing a piezoelectric crystal to vary the contour of one of the mirror surfaces in a laser. The variation gates the laser on and off.

U.S. Pat. No. 3,440,560 to Pole, issued Apr. 22, 1969, discloses apparatus for controlling the emission of laser light utilizing a piezoelectric crystal to move a transparent plate which frustrates the total internal reflection from a surface of laser material. This varies the critical angle for total internal reflection at this surface, and consequently varies the direction of laser light emission.

U.S. Pat. No. 3,458,829 to Pole et al, issued July 29, 1969, discloses apparatus for controlling the area of emission of laser light utilizing two piezoelectric crystals, each coupled to a respective transparent plate, each plate frustrating the total internal reflection from a respective surface of a laser material.

U.S. Pat. No. 3,650,187 to Judin, issued Mar. 21, 1972, discloses an oscillating ball which is piezolectrically driven with the ball acting as a moving lens for a beam of light.

U.S. Pat. No. 3,834,795 to Erickson et al, issued Sept. 10, 1974, discloses the use of a piezoelectric crystal to generate an acoustic shock wave. When this wave impinges on a highly reflecting Fabry-Perot resonator, the latter becomes transmitting while the shock wave passes through it. Thus, light impinging on this resonator is gated through it.

U.S. Pat. No. 3,976,358 to Thompson, issued Aug. 24, 1976, discloses the coupling of light between two parallel optical waveguides by a switchable directional coupler technique. The material between the waveguides is a semiconductor. An applied electric field creates a change in the index of refraction which modulates the optical coupling. No mechanical motion is involved.

U.S. Pat. No. 4,146,856 to Jaeschke, issued Mar. 27, 1979, discloses a reed switch in combination with associated fiber optic cables. The two optic cables, and the reed switch, are normally disengaged. Under the influence of a magnetic field, the switch closes, and the optic cables are aligned. In the absence of a magnetic field, one of the optic cables aligns with a third fixed optic cable.

British Pat. No. 1,426,475 discloses the use of the reed relay principle to switch a fiber between positions of alignment with two other fibers. In a reed relay, one of two vanes is moved between two positions, depending on whether a magnetic field is or is not applied. In the switch, one fiber is attached to the movable vane and the other two to the fixed vane. Movement of the reeds is by electromagnetic means.

In an article entitled "Piezoelectric Ceramic Transducers" by Charles Edmiston in *Electronic Design*, No. 18, Sept. 1, 1974, pages 78 to 82, it is stated that a piezoelectric ceramic bender takes advantage of the transverse expansion and contraction when volages are applied in a specific direction. If one of the electrode surfaces of a long thin piece of ceramic is bonded to a thin substrate so one surface is free and the other restricted, the transducer will bend when voltage is applied. The bending motion is analogous to the curve in a bimetallic strip used in thermostats. To multiply the bending action, piezoelectric transducers are placed on both sides of the substrate. Thus, when voltage is applied, one transducer expands while the other contracts.

Bimorph configurations and multimorph flexure configurations are described in an article entitled "Consider Piezoelectric Ceramics" by Dr. Thomas G. Reynolds, III, and David M. Tanka in an article published in *Electronic Design*, No. 19, Sept. 13, 1977, at pages 92 to 97.

SUMMARY OF THE INVENTION

Another object of this invention is to provide for a new and improved optical switch that is capable of switching between mutlimode optical fibers.

Yet another object of this invention is to provide for a new and improved use of a piezoelectric bimorph or multimorph which is capable of moving an attached fiber into efficient coupling alignment with any one of two or more other fibers.

Still another objec of this invention is to provide for a new and improved optical switch which combines small size with simple operation and the ability to switch between many fibers.

Still yet another object of this invention is to provide for a new and improved optical switch for use in the fiber optical communications field. In accordance with one embodiment of the invention, the piezoelectric optical switch includes a piezoelectric bending element having one end fixed in position, having an opposite end free, and adapted to be piezoelectrically bent along an axis joining the one end and the opposite end. A first optical fiber is affixed with its axis along the axis of the bending element. A second optical fiber is provided in general proximity to, and is adapted to be aligned with, the first optical fiber. Means are provided for applying a first voltage to cause the bendinbg element to orient the first optical fiber in alignment with the second optical fiber and for providing a second voltage to cause the bending element to orient the first optical fiber in nonalignment with the second optical fiber. The bending element can be a bimorph or a multimorph.

In accordance with another embodiment of the invention, a combination is provided including a piezoelectric bending element having one end fixed in position, having an opposite end free, and is adapted to be piezoelectrically bent along an axis joining the one end and the opposite end. A first optical fiber is affixed with its axis along the axis of the bending element. A plurality of optical fibers, each in general proximity to, and each adapted to be aligned with, the first optical fiber is provided. Means are provided for selectively applying one of a like plurality of voltages to the element to cause the bending element to orient the first optical fiber in alignment with a corresponding one of the plurality of optical fibers. In accordance with certain features of the invention, the voltages are of different values; the element can be a bimorph or a multimorph.

In accordance with still yet another embodiment of the invention, the combination includes a nonpiezoelectric cantilever beam having one end fixed to a first support and having an opposite end free, and adapted to be bent along an axis joining the one end and the opposite end. A first optical fiber is affixed to the cantilever beam. A plurality of optical fibers, each in general proximity to and each adapted to be selectively aligned with the first optical fiber, is provided. A piezoelectric bending element, having opposite ends coupled to a second support and a third support, has a medial portion coupled to the cantilever beam near the one end. Thus, upon application of a first voltage to the bending element, the first optical fiber is caused to be aligned with a specific one of the plurality of optical fibers. Upon application of a different voltage to the bending element, the first optical fiber is caused to be aligned with a specific different one of the plurality of optical fibers. In accordance with certain features of the invention, the first optical fiber has its axis aligned along the axis of the cantilever beam. With certain features, the bending element can be a bimorph or a multimorph.

BRIEF DESCRIPTION OF THE DRAWINGS

Other objects, advantages, and features of this invention, together with its construction and mode of operation, will become more apparent from the following description, when read in conjunction with the accompanying drawings, in which:

FIG. 1 is a top view of one embodiment of the invention;

FIG. 2 is a side view of the embodiment depicted in FIG. 1; and

FIG. 3 is a side view of another embodiment of the invention.

DESCRIPTION OF PREFERRED EMBODIMENTS

To obtain the amount of motion needed in an optical switch, the use of expansion and contraction in piezoelectric solids with an applied field is generally insufficient. Preferably, one must use bending motions, for example, in a bimorph configuration. A bimorph consists of two strips of piezoelectric material, such as PZT (lead zirconate titanate), attached together after putting electrodes on their surfaces. In one configuration ("series"), the strips have opposite directions of poling (i.e., anti-parallel directions of polarization); and in another configuration ("parallel"), the strips have parallel polarization vectors $\vec{P}$. Depending on the direction of the transverse electric field $\vec{E}$ applied in one strip, the strip either elongates or contracts in length in an amount proportional to the piezoelectric coefficient $d_{31}$. In a bimorph, application of $\vec{E}$ is parallel to $\vec{P}$ in one strip and antiparallel to $\vec{P}$ in the other. This produces a bending of the bimorph so that when one end is fixed (cantilever arrangement), the other moves by an amount $$x = \frac{3}{2} d_{31} \frac{E}{t} L^2$$

where E is the applied field, t is the total bimorph thickness and L is the bimorph length. For L = 1.5 in., t = 0.04 in. and allowable E of $2.54 \times 10^4$ volts/in. (for one type of commercially available PZT), the equation yields an x of ±10 mils where ± refers to the two directions in which E can be applied. For a device that moves such a distance, one fiber (5 mils diameter) can be switched between four fiber positions. An even larger displacement of an attached fiber's tip can occur when the tip overhangs the bimorph by a significant amount such as 0.5 in.

Referring to FIGS. 1 and 2, there is shown a piezoelectric bending element 10 including two piezoelectric strips 11, 12 attached together. One end of the bimorph 10 is fixed in position by a support 13. An optical fiber 14 is oriented with its axis along the axis of the bimorph 10 and is affixed in place by suitable adhesive 16—16.

In close proximity to the free end 17 of the optical fiber 14 is a plurality of other optical fibers 18, 19, and 20, the various fibers 18, 19, and 20 being oriented in close proximity to, and adapted to be aligned with, the optical fiber 14.

A suitable voltage is applied from a source 21 via appropriate leads 22—22 to the bimorph 10. Application of an appropriate DC voltage to the bimorph 10 causes the bimorph to bend so that the end 17 of the optical fiber 14 is aligned with the optical fiber 18. By impressing a different voltage onto the bimorph 10, the optical fiber 14 is caused to align with the optical fiber 20. By the application of still a third different voltage, possibly 0, the optical fiber 14 is caused to align with the optical fiber 19.

An advantage of the piezoelectric switch described hereinabove over the prior art is that it permits the switching of one fiber between more than two fibers. Futher, the piezoelectric switch is operated by a DC voltage and draws no current once the voltage is applied in that the system acts as a capacitance. Thus, the piezoelectric optical switch described hereinabove is unlike mechanical devices which utilize electromagnetic coils. Electromagnetic coils draw current in at least one switch position. Another advantage is that the piezoelectric optical switch described hereinabove can be more compact than other mechanical switches, although in one dimension, it may be as long a 2 in. depending upon the number of switch positions desired. Further, the piezoelectric switch described herein has a potentially very low insertion loss, well under one decibel.

In accordance with still yet another embodiment of the invention, a multimorph is utilized in lieu of a bimorph. A multimorph involves only a single strip of material but has electrode coated holes within it for applying a desired electric field configuration. It is almost as effective in producing deflection as a bimorph.

Still yet another technique is to fix both ends of the bimorph or the multimorph. In such an arrangement, the center of the device deflects. Referring to FIG. 3, a piezoelectric bending element 30 has its ends 31, 32 pinned to fixed supports 33, 34. A point 36 on the element 30 is coupled to near one end 37 of a nonpiezoelectric cantilever beam 38 to which an optical fiber 39 is oriented along its length. The one end 37 of the nonpiezoelectric cantilever beam 38 is affixed to a fixed support 40. The free end 41 of the optical fiber 39 is in close proximity to, and adapted to be aligned with, a plurality of optical fibers 42, 43, 44, 45. By the application of an appropriate voltage, by means not shown, to the piezoelectric bending element 30, the bending element 30 bends or unbends and produces a variable deflection along it smedial point 36 which is applied to the cantilever beam 38. Since the point of coupling of the medial point 36 with the beam 38 is close to the point 37, any small deflection applied to the cantilever beam 38 near the point 37 is magnified along the length of the cantilever beam to cause an even greater deflection of the end 41 of the optical fiber 39. Thus, in such an arrangement, as the center of the piezoelectric beam 30 deflects, it yields a larger force than at the end of a cantilever type device, but correspondingly less deflection. Such a force is used to bend a nonpiezoelectric beam which has a suitable lever ratio so that the attached fiber 39 can have a larger deflection than in the piezolectric cantilever arrangement. This is especially useful for larger fibers such as an 8 mil core fiber.

Other modifications will suggest themselves to those skilled in the art without departing from the spirit and scope of this invention. For example, more than one fiber can be bent simultaneously. Physical stops can be used to prevent overshooting.

What is claimed is:

1. In combination,
   a piezoelectric bending element having one end fixed in position, having an opposite end free, and adapted to be piezoelectrically bent along an axis joining said one end and said opposite end;
   a first optical fiber affixed with its axis along said axis of said bending element;
   a second optical fiber in general proximity to, and adapted to be aligned with, said first optical fiber; and
   means for applying a first voltage to cause said bending element to orient said first optical fiber in alignment with said second optical fiber, and for applying a second voltage to cause said bending element to orient said first optical fiber in nonalignment with said second optical fiber.

2. The combination as recited in claim 1 wherein said element is a bimorph.

3. The combination as recited in claim 1 wherein said element is a multimorph.

4. In combination,
   a piezoelectric bending element having one end fixed in position, having an opposite end free, and adapted to be piezoelectrically bent along an axis joining said one end and said opposite end;
   a first optical fiber affixed with its axis along said axis of said bending element;
   a plurality of optical fibers, each in general proximity to, and each adapted to be aligned with, said first optical fiber; and
   means for selectively applying one of a like plurality of voltages to said element to cause said bending element to orient said first optical fiber in alignment with a corresponding one of said plurality of optical fibers.

5. The combination as recited in claim 4 wherein said voltages are of different values.

6. In combination,
   a first fixed support;
   a nonpiezoelectric cantilever beam having one end fixed to said support, and having an opposite end free, and adapted to be bent along an axis joining said one end and said opposite end;
   a first optical fiber affixed to said cantilever beam;
   a plurality of optical fibers, each in general proximity to, and each adapted to be selectively aligned with, said first optical fiber;
   a second fixed support;
   a third fixed support; and
   a piezoelectric bending element having opposite ends coupled to said second support and said third support, and having a medial portion coupled to said beam near said one end;
   whereby application of a first voltage to said bending element causes said first optical fiber to be aligned with a specific one of said plurality of optical fibers, and application of a second voltage to said bending element causes said first optical fiber to be aligned with a specific different one of said plurality of optical fibers.

7. The combination as recited in claim 6 wherein said first optical fiber has its axis affixed along said axis of said cantilever beam.

8. The combination as recited in claim 6 wherein said bending element is a bimorph.

9. The combination as recited in claim 6 wherein said bending element is a multimorph.

* * * * *